US006183579B1

United States Patent
Ware et al.

(10) Patent No.: US 6,183,579 B1
(45) Date of Patent: Feb. 6, 2001

(54) METHOD OF MANUFACTURING EVAPORATIVE COOLER PADS

(75) Inventors: Udale G. Ware, Dinuba; Robert E. Matthews, Fresno, both of CA (US)

(73) Assignee: PPS Packaging Company, Fowler, CA (US)

( * ) Notice: Under 35 U.S.C. 154(b), the term of this patent shall be extended for 0 days.

(21) Appl. No.: 09/211,983

(22) Filed: Dec. 14, 1998

(51) Int. Cl.$^7$ ........................................................ B32B 7/08
(52) U.S. Cl. .................................. 156/92; 156/88; 156/91; 156/93; 428/76
(58) Field of Search ................................ 156/88, 93, 250, 156/305; 261/100; 428/76; D23/351, 352, 354

(56) References Cited

U.S. PATENT DOCUMENTS

| | | | | |
|---|---|---|---|---|
| 2,244,097 | * | 6/1941 | Burkart | 428/74 |
| 2,505,045 | * | 4/1950 | Holcomb | 428/108 |
| 4,961,982 | * | 10/1990 | Taylor | 428/41 |

* cited by examiner

Primary Examiner—Michael W. Ball
Assistant Examiner—Jessica Rossi
(74) Attorney, Agent, or Firm—Richard A. Ryan

(57) ABSTRACT

A method of making evaporative cooler pads having a mat of absorbent material substantially uniformly distributed throughout the mat to provide the desired thickness and density to efficiently cool by evaporation warm air that is passed through the mat attached to an evaporative cooler system. The absorbent material can comprise excelsior in the form of aspen wood fibers. This material is cut into mats of the desired size and separated from other mats to create gaps between the mats. A mesh netting encloses the mat and the gap between mats. A stitching machine adds stitching to the mat and to the netting in the gaps between mats to bind the netting to the mat and to interconnect the netting layers in the gap. Adhesive material is applied to the netting and stitching in the gaps to retain the mat inside the netting. A cutting assembly cuts in the gap between the mats to form individual cooler pads. The sealed ends of the netting beyond the mats prevents loss of absorbent material and assists in maintaining the mat in a sufficiently stable mass to be utilized as a cooler pad.

16 Claims, 3 Drawing Sheets

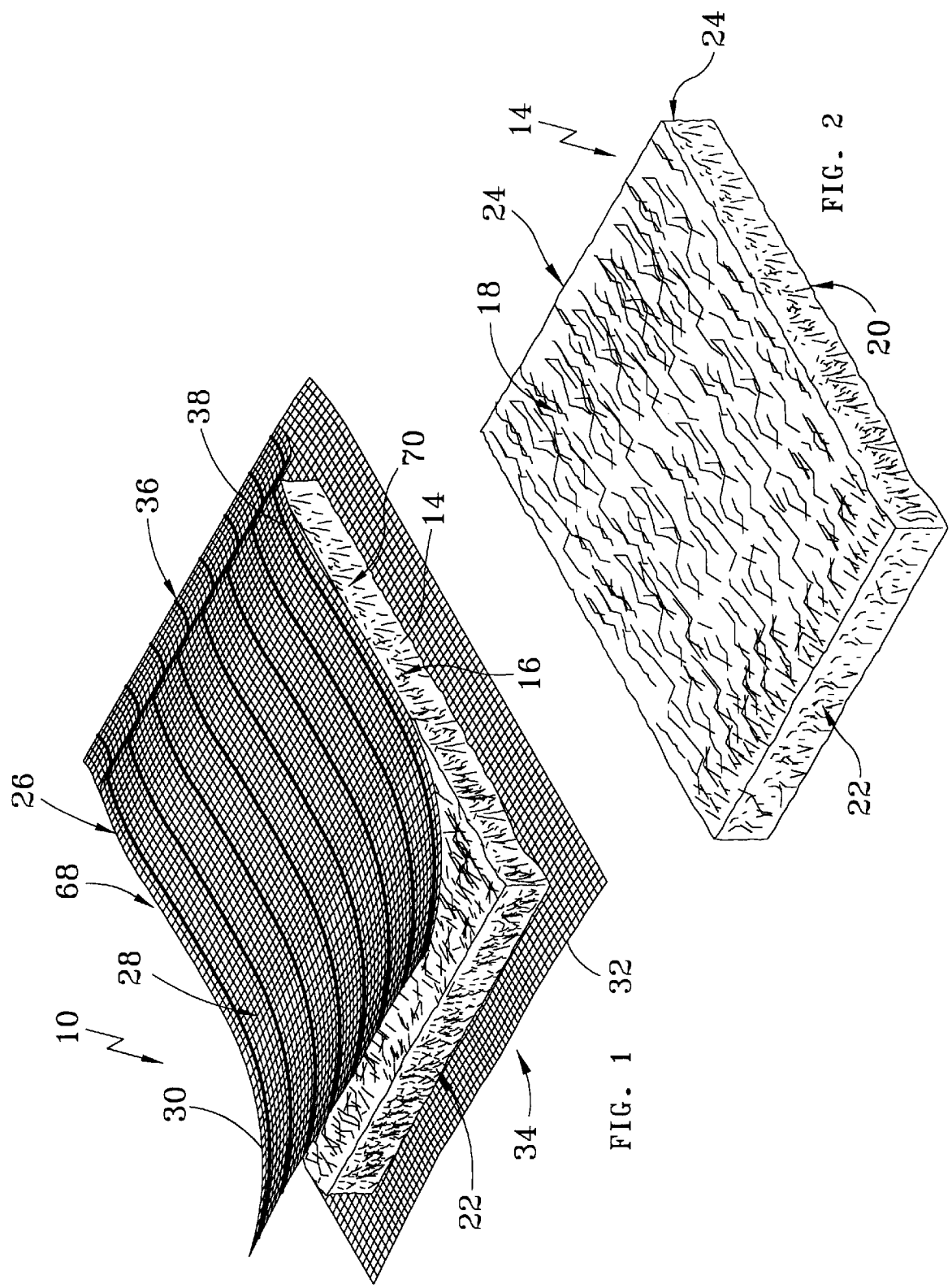

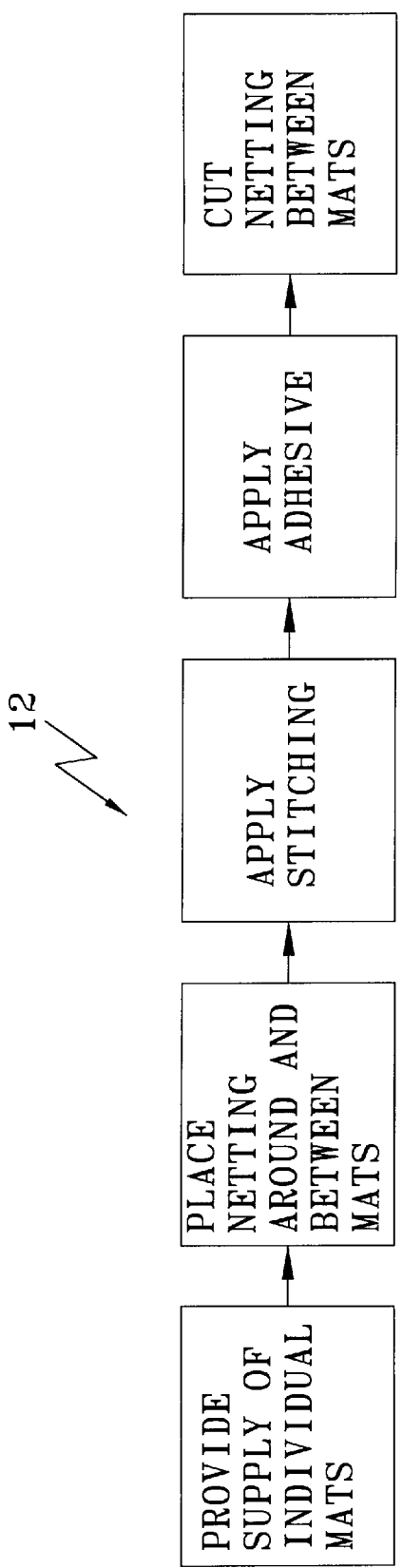
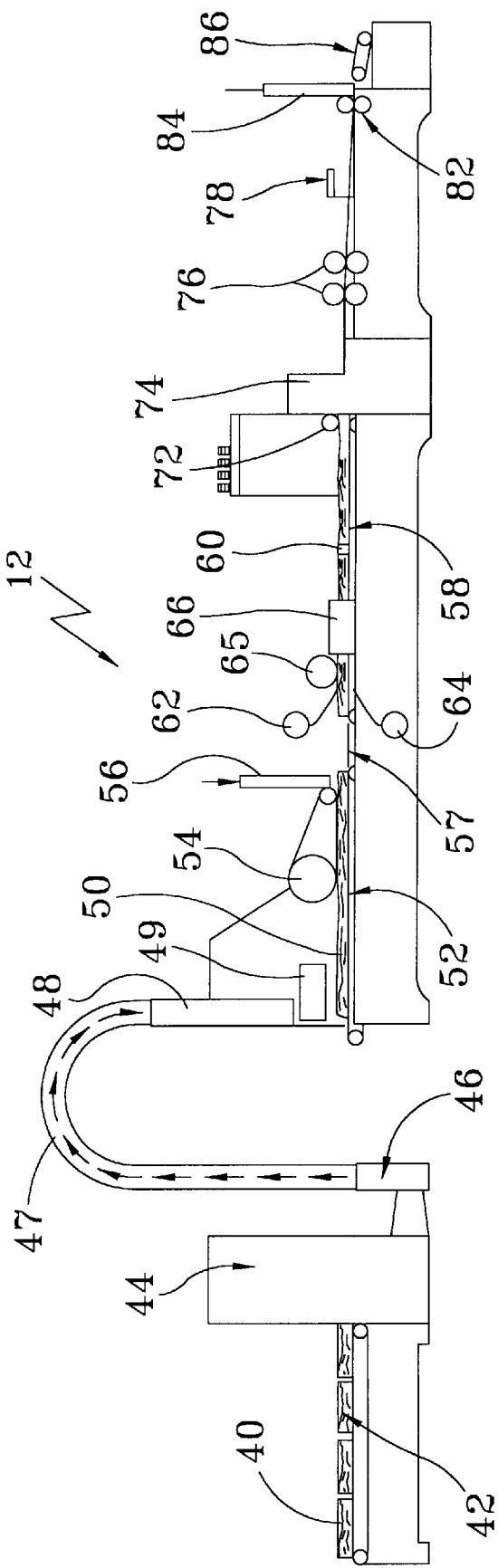

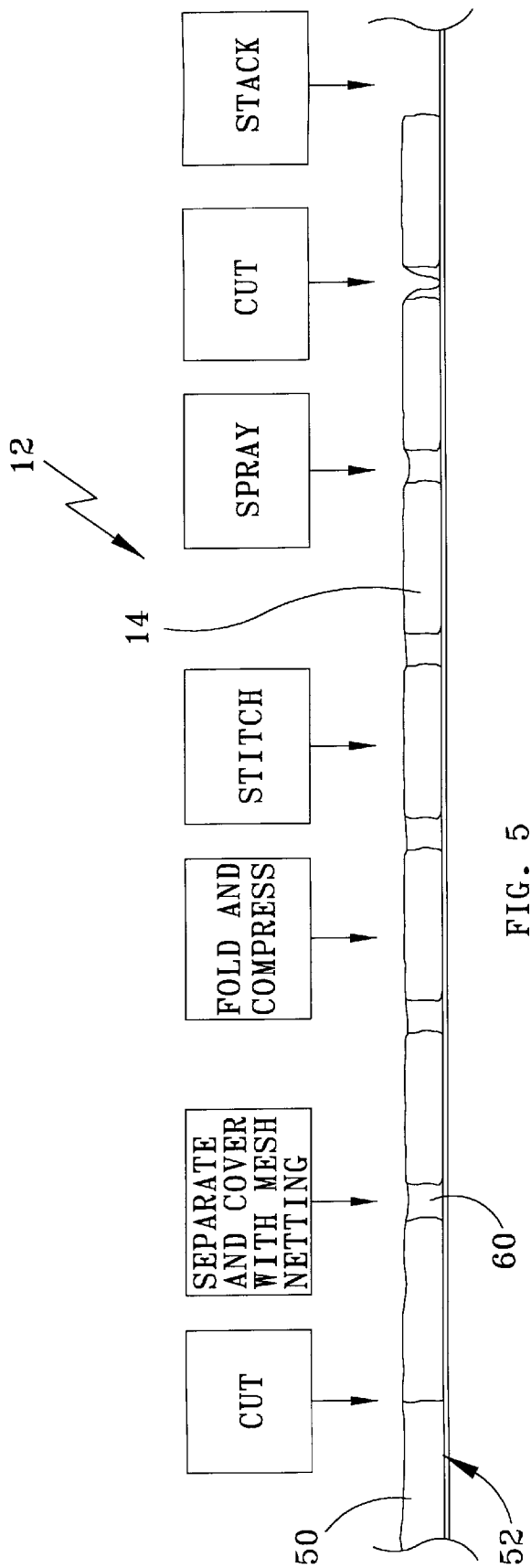
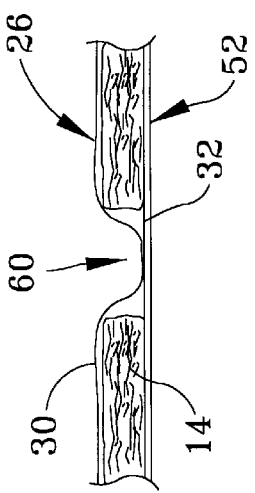
FIG. 5
FIG. 6

METHOD OF MANUFACTURING EVAPORATIVE COOLER PADS

BACKGROUND OF THE INVENTION

1. Field of the Invention

The field of the present invention relates generally to the assembly of evaporative cooler pads that are used in evaporative coolers for absorbing water to cool warm air that flows through the cooler pad and into a cooling system. In particular, the present invention relates to the manufacturing of evaporative cooler pads that utilize absorbent media contained in a mesh material.

2. Background

Evaporative cooler systems are commonly used in warm areas having relatively low humidity to produce cool air for use to cool the interior of houses, businesses and other structures at a relatively low cost. Such systems employ an evaporative cooler having a cabinet-like housing with one or more cooler pads located on the outer edge(s) of the housing. The evaporative cooler housing is typically located on or near the structure to pull warm air into the cooler, cool the air and deliver it through one or more vents located in the structure to distribute cool air in the structure's interior. Cooling of the warm air is achieved by pulling warm air across the wetted cooler pad or pads with the use of a fan or blower mounted inside the housing. A water circulation system including a pump, source of water and a water distribution mechanism located inside the housing supplies water to the cooler pad to keep it in a wetted condition so that it can effectively cool the warm incoming air by evaporation.

The typical evaporative cooler housing is made into a square or rectangular shaped open frame, although other shapes are also suitable, that is configured to demountably hold a cooler pad containment structure at the open faces of the housing frame. Typically, the cooler pad containment structure contains the cooler pad in an upright position so that water from the water circulation system flows down across and through the cooler pad to wet substantially the entire absorbent media in the cooler pad. In general, the cooler pad is sized and configured to fit inside the containment structure so as to completely fill the open faces of the housing frame.

The wettable cooler pad medium may be formed of any suitable material that is capable of absorbing water and allowing air to pass through the cooler pad. Although recent cooler pads have utilized a number of synthetic materials as the wettable medium, the most commonly used material is wood excelsior. Excelsior cooler pads are generally made from fine aspen wood fibers which are interwoven in a randomly orientated pattern to form a highly porous, absorbent material that has been found to be very effective for evaporative cooler systems. The typical excelsior cooler pad has a plastic or cloth netting that contains the excelsior media in a square or rectangular pad shape. Spikes or wires used in the typical containment structure penetrate the cooler pad to hold the cooler pad in place against the open face of the housing and maintain it as a non-sagging mass.

The manufacturing of the excelsior cooler pad typically involves forming a continuous mat of excelsior fibers of the desired width and thickness on an automated conveyor belt assembly either directly from the excelsior manufacturing process or from bales of excelsior material. The netting, typically made of polypropylene material, is applied to the upper and lower surfaces of the cut mat to form a continuous flow between the upper and lower netting. A stitching machine sews stitching material into the pad to hold the excelsior pad between and to the upper and lower netting. The continuous sheet of pad and netting is cut to the desired length. To avoid loss of material from the cut ends of the pad, the ends are stitched or glued together or, alternatively, a narrow strip or piece of netting is applied to each end and then sewn or glued on. The end stitching or gluing requires a separate step in the manufacture of cooler pads presently available.

To avoid the extra step of sealing the ends, some cooler pad manufactures cut the excelsior pad prior to placing the netting on the pad so as to obtain a gap between pad sections that will only have netting. Glue is applied to the surface of the pad, including the netting gap, and then the netting between the pad sections is cut, leaving the ends sealed by the glued netting. Although this method of manufacturing avoids the necessity for an extra sealing step, it does not provide an end seal that is as strong and durable as desired or adequately secure the netting to the pad. What is needed is a process of manufacturing a cooler pad that provides a stitched cooler pad with ends that are sewn, without the need for the extra step of sewing the ends after manufacture of the cooler pad, and that has the netting securely combined with the excelsior fibers.

SUMMARY OF THE INVENTION

The method of manufacturing cooler pads of the present invention solves the problems identified above. That is to say, the present invention provides a process of manufacturing cooler pads that fixedly seals the ends of the cooler pads with sewing material without the need for a separate end sewing step and that securely connects the netting to the fibers. As such, the method of the present invention is particularly suitable for automated processes that provide continuous flow manufacturing of evaporative cooler pads.

In the primary embodiment of the present invention, the method of manufacturing evaporative cooler pads starts with a source of absorbable, porous media that is placed on a first conveyor belt assembly. The media is shaped into a continuous mat of such material and compressed into the desired width, thickness and density. A first cutting assembly cuts the continuous mat into individual mats having the desired length. The pulling action of a second conveyor belt assembly creates a gap between cut mats. After the second conveyor belt assembly pulls the cut mat away from the continuous mat, mesh netting is placed on the opposing upper and lower surfaces of the individual mats.

After covering the upper and lower surfaces of the mat and the gap between mats with netting, the method of the present invention folds the lower netting around the sides of the mat and over on top of the mat and applies rows of stitching to the netting and mat. The stitching fixedly attaches the netting to the upper and lower surfaces of the mat to contain the mat inside the netting material. The netting in the gap between mats is also stitched to seal the ends of the netting and avoid loss of mat material and sagging of the mat. After stitching, adhesive material is applied to the netting and stitching in the gap between mats by spraying or other mechanism to further seal the ends of the netting and keep the stitching from unraveling after it is cut. Compression rollers further compress the mat and a second cutting assembly cuts the netting between the mats to form a cooler pad of the desired length. A take-off conveyor belt assembly takes the completed cooler pad off the belt conveyor system.

Accordingly, the primary objective of the present invention is to provide a method of manufacturing evaporative cooler pads that provides a cooler pad that effectively contains the absorbent material in the cooler pad that does not require an extra finishing step to seal the ends of the pad.

It is also an important objective of the present invention to provide a method of manufacturing cooler pads that utilizes a system of continuous stitching to seal the ends of the cooler pad that is suitable for use with automated cooler pad manufacturing systems.

It is also an important objective of the present invention to provide a method of manufacturing cooler pads that seals the stitched ends of the cooler pad with an adhesive to further strengthen the ends thereof and keep the stitches from becoming unraveled or undone.

It is also an objective of the present invention to provide a method of manufacturing cooler pads with stitched and sealed ends that is suitable for use with different types of absorbent media to produce a variety of different size cooler pads.

The above and other objectives of the present invention will be explained in greater detail by reference to the attached figures and the description of the preferred embodiment which follows. As set forth herein, the present invention resides in the novel features of form, construction, mode of operation and combination of processes presently described and understood by the claims.

BRIEF DESCRIPTION OF THE DRAWINGS

In the drawings which illustrate the best modes presently contemplated for carrying out the present invention:

FIG. 1 is a perspective view of an evaporative cooler pad made by the preferred embodiment of the present invention;

FIG. 2 is a perspective view of the mat utilized in the method of the present invention;

FIG. 3 is a block diagram of the basic steps of manufacturing evaporative cooler pads according to the present invention;

FIG. 4 is a side view of an automated process utilizing the method of manufacturing evaporative cooler pads of the present invention;

FIG. 5 is a schematic showing various steps in the method of the present invention; and FIG. 6 is a close-up view of the gap between mats that is utilized in the method of the present invention.

DETAILED DESCRIPTION OF THE PREFERRED EMBODIMENTS

With reference to the figures where like elements have been given like numerical designations to facilitate the reader's understanding of the present invention, and particularly with reference to the embodiment of the present invention illustrated in FIGS. 1 through 6, the preferred embodiment of the present invention is set forth below. FIG. 1 illustrates the evaporative cooler pad 10 made from the method of manufacturing evaporative cooler pads of the present invention, designated generally as 12, and shown in FIGS. 3 through 5. Cooler pad 10 is formed from a mat 14, shown in detail in FIG. 2, of substantially uniformly distributed absorbent media, such as aspen wood fibers (excelsior) 16 or other varieties of natural cellulosic materials, such as paper or other wood products. Aspen wood fibers 16 are commonly used due to the superior qualities, including its availability, cost and ease of forming into wood fibers to create a mat 14 having an open cellular structure providing a highly absorbent mat 14 that holds more water and creates more evaporative wicking area per square inch than many other materials. The natural wood of the excelsior material 16 also reduces the likelihood of objectionable odors from the cooling system.

In the preferred embodiment, wood fibers 16 are thinly cut into individual segments that enable them to be mechanically layered and oriented in a generally horizontal plane in a mat 14 of uniform thickness and density having opposing upper surface 18 and lower surface 20 and opposing first edge 22 and second edge 24. Typical dimensions of such individual segments used by those in the industry are 0.042 inch width, 0.021 inch thickness and 18 inch length. As is known by those skilled in the art, a variety of sizes of the individual segments are available for the absorbent material. If the segments are too small, they will break easily and not stay together as a mat. If the segments are too large, the amount of surface area available for contact with the warm air will be substantially diminished, thereby reducing the cooling efficiency of the pad. Also in the preferred embodiment, the wood fiber segments are curled and barbed during the cutting process for added water holding capability. The wood fibers 16 are layered in a direction generally parallel with opposing upper 18 and lower 20 surfaces. The wood fibers 16 become intertwined and interwoven to form a plurality of interstices and passageways throughout mat 14 so that water may be absorbed by wood fibers 16 and warm air directed at cooler pad 10 may flow generally freely and uniformly through the pad 10 and into the cooling system after being cooled by heat transfer between the wetted mat 14 and the air.

To facilitate handling of pad 10 and to ensure the wood fibers 16 remain in the pad 10, a mesh netting 26 abuts against the surfaces of mat 14. Typically, netting 26 is made of a polypropylene plastic material having mesh openings 28 that are formed from approximately six strands per inch in each direction. Mesh openings 28 must be sized to contain wood fibers 16 in mat 14 without inhibiting the flow of air through pad 10 when in use. If mesh openings 28 are too large, pieces of wood fibers 16 from mat 14 would pass through pad 10 and into the cooler's water circulation system where it could clog pumps, water distribution systems and filters. Upper netting layer 30 abuts against the upper surface 18 of mat 14 and the lower netting layer 32 abuts against the lower surface 20 of mat 14. In the method of manufacturing set forth below, the netting 26 on an individual cooler pad 10 extends beyond the first 22 and second 24 edges of mat 14. To facilitate the reader's understanding of the method set forth herein, the netting extending beyond the first edge 22 of mat 14 is referred to as the first net end 34 and the netting extending past the second end 24 of mat 14 is referred to as the second net end 36. First 34 and second 36 net ends should provide sufficient space between the end of the netting 26 and the first 22 and second 24 edges to provide room to contain loose fibers.

Netting 26 is secured to mat 14 with rows of stitching 38 spaced across the mat as preferred by the manufacturer. In the preferred embodiment of the cooler pad 10 of the present invention, the stitching rows are spaced apart approximately every two inches. The stitching 38 runs the entire length of the cooler pad 10 from first net end 34 to second net end 36. Those prior art cooler pads that utilized stitching 38 similar to that set forth herein, but which required the edges of the mat 14 to be separately stitched, only have stitching 38 running from the first edge 22 to the second edge 24 of mat 14. Stitching 38 penetrates mat 14 to stabilize and unitize the wood fibers 16 in mat 14 to substantially eliminate sagging of pad 10 when placed in a vertical position, as used in the typical cooling system. The stitching 38 can be made from plastic or a biodegradable material such as jute, cotton or other natural fibers.

The evaporative cooler pad 10 described above is manufactured by the process 12 described below and illustrated in FIGS. 3 through 5. The block diagram in FIG. 3 illustrates the basic steps in the process of manufacturing cooler pad 10. FIG. 4 illustrates the equipment and various steps utilized in manufacturing the cooler pad 10 of the preferred embodiment. The basic steps of manufacturing cooler pad 10, as shown in FIG. 3, requires a supply of individual mats 14 separated from each other a sufficient distance to create first 34 and second 36 ends of netting beyond the first 22 and second 24 edges of mat 14. Netting 26 is placed in surrounding relation to mat 14 by placing upper netting layer 30 against upper surface 18 and lower netting layer 32 against lower surface 20. Rows of stitching 38 are applied to mat 14 to fixedly attach netting 26 to mat 14 and to seal the first 34 and second 36 ends of netting to form the excelsior 16 or other materials into a cooler pad 10 that will withstand sagging and prevent loss of excelsior material from pad 14. Adhesive material, such as plastic hot melt type 80860 available from SWIFT, is applied to the first 34 and second 36 ends of netting to seal mat 14 inside netting 26. A cutting device then cuts the netting 26 between a pair of mats 14 to form individual evaporative cooler pads 10. The cooler pads can then be packaged and stacked for shipping.

As shown in the detailed illustration in FIG. 4, the method 12 of the preferred embodiment of the present invention starts with a supply of pad 14 material, preferably a supply of fibrous material such as excelsior 16. Typically, the supply of excelsior 16 is provided in bales 40 that are placed on bale conveyor 42 to feed the bales 40 into a bale breaker 44. Bale breaker 44 breaks the bales 40 into a loose mix of excelsior 16 that is then fed into blower 46 that blows the excelsior 16 through blower line 47 into box feeder 48 and picker 49, which places a continuous stream of excelsior 16 in an elongated mat 50 on a first conveyor belt assembly 52.

The mat 50 deposited on first conveyor belt assembly 52 is compressed by one or more compression rollers 54 to form the uniformly thick and dense material needed for mat 14. After the elongated mat 50 passes under the first cutting assembly 56 and is cut into the desired length for mat 14, the mat 14 is pulled across shelf 57 by a second conveyor belt assembly 58 that moves at a higher speed than the first conveyor belt assembly 52. The increased speed from the pulling action of the second conveyor belt assembly 58 separates the cut mat 14 from the elongated mat 50, creating gap 60 between the cut mats 14, as shown in FIGS. 5 and 6. As the second conveyor belt assembly 58 pulls mat 14 from elongated mat 50, netting 26 is placed on mat 14 from a pair of netting rolls 62 and 64. Netting roll 62 supplies upper netting layer 30 against upper surface 18 and netting roll 64 supplies lower netting layer 32 against lower surface 20. After netting 26 is placed on mat 14, drum roller 65 presses down on mat 14 while lower netting 32, which is wider than mat 14, is folded over opposing sides 68 and 70 of mat 14 onto mat 14 by folding device 66. Roller 72 compresses mat 14 and netting 26 to form mat 14 with netting 26 into the desired thickness and density. Second conveyor belt assembly 58 then feeds mat 14 into stitching machine 74. Alternately, a separate conveyor belt assembly (not shown) can be utilized to feed mat 14 into stitching machine 74.

Stitching machine 74 applies rows of stitching 38 to the mat 14 to bind the netting 26 to mat 14, including that portion of the netting folded over from sides 68 and 70. As is known in the art, each row of stitching 38 can be a single thread having a double loop at the bottom. The stitching 38 is continuously applied by stitching machine 74 to the mat 14 and netting 26, such that the netting 26 in gap 60 also contains stitching 38. Unlike prior art methods of making evaporative cooler pads, which did not stitch the netting 26 in gap 60, the method of the present invention stitches the netting 26 in the gap 60 to more securely seal the first 34 and second 36 ends of netting 26 to prevent loss of excelsior 16 and collapse or breakdown of mat 14. Loss of excelsior 16 or breakdown of mat 14 is likely to result in damage to or clogging of the water circulation system in the evaporative cooler, requiring increased repair and maintenance, and loss of efficiency for the entire cooling system. The cooler pad 10 made by the method of the present invention reduces the likelihood of such problems, resulting in a more efficient cooling system that requires less repair and maintenance.

After stitching 38 is applied to the flow of mats 14, As stitching is applied to the flow of mats 14, double draw rollers 76 pull the flow of mats 14 through the stitching machine 74. Double draw rollers 76 are used so that at least one set of rollers are on mats 14 at all times to hold the netting 26 taut and to pull mat 14 through stitching machine 74 at a constant speed. After stitching is applied, draw roller 82 pulls the flow of mats 14 under adhesive applicator 78 to apply an adhesive material, such as plastic hot melt, to the netting 26 and stitching 38 in the gap 60. Adhesive applicator 78 can comprise one or more spray head assemblies (not shown) suitable for spraying hot melt or other adhesives across gap 60 to seal the netting 26 and stitching 38 in the gap 60. After applying the adhesive, the draw rollers 82 pull the flow of pads 14 under a second cutting assembly 84 to cut the netting 26 and stitching 38 in gap 60 to form cooler pad 10 having sealed ends 34 and 36. A take-off conveyor belt system 86 removes the cut pads 10 from the conveyor system 52. Prior to removing the pads 10 from the conveyor system 52, the pads can be covered by plastic or paper material, or other materials as desired, to protect the cooler pads 10 during shipment and make them more presentable for retail sales.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A method for manufacturing evaporative cooler pads from a supply of mat material, comprising the steps of:
    forming said supply of mat material into an elongated mat on first conveyor belt assembly;
    cutting a mat out of said elongated mat;
    forming a gap between said mat and said elongated mat by using a second conveyor belt assembly moving at a higher speed than said first conveyor belt assembly to pull said mat away from said elongated mat;
    placing a mesh netting against said mat and in said gap to enclose said mat and said gap in said netting;
    applying one or more rows of stitching to said netting against said mat and in said gap to bind said netting to said mat and to interconnect said netting in said gap;
    cutting said netting and said stitching in said gap.

2. The method of claim 1, wherein said step of placing a mesh netting against said mat and said gap comprises applying an upper netting layer to an upper surface of said mat and applying a lower netting layer to a lower surface of said mat.

3. The method of claim 2, wherein said stitching in said gap connects said upper netting layer to said lower netting layer.

4. The method of claim 1 further comprising the step of folding a portion of said netting across at least one side of said mat before the step of applying said stitching to said netting and mat.

5. The method of claim 1 further comprising the step of compressing said netting and said mat before applying said stitching to said netting against said mat and in said gap.

6. The method of claim 1, wherein said step of applying adhesive to said netting and said stitching in said gap includes the step of applying adhesive to all of said netting and said stitching to bind said netting and said stitching to said mat.

7. The method of claim 1 further comprising the step of applying an adhesive to said netting and said stitching in said gap to seal said stitching to said netting in said gap before the step of cutting said netting and said stitching in said gap.

8. The method of claim 1, wherein said step of applying adhesive to said netting and said stitching in said gap includes spraying said adhesive.

9. The method of claim 1 further comprising the step of pulling said mat and said mesh netting with a double draw roller after the step of applying said one or more rows of stitching.

10. A method for manufacturing evaporative cooler pads from a supply of mat material, comprising the steps of:

forming said supply of mat material into an elongated mat on a first conveyor belt assembly;

cutting a mat out of said elongated mat;

forming a gap between said mat and said elongated mat by using a second conveyor belt assembly moving at a higher speed than said first conveyor belt assembly to pull said mat away from said elongated mat;

placing a mesh netting against said mat and in said gap to enclose said mat and said gap in said netting by applying an upper netting layer against an upper surface of said mat and a lower netting layer against a lower surface of said mat;

applying one or more rows of stitching to said netting against said mat and in said gap to bind said netting to said mat and to connect said upper netting layer to said lower netting layer in said gap;

applying an adhesive to said netting and said stitching in said gap to seal said gap; and cutting said netting and said stitching in said gap.

11. The method of claim 10 further comprising the step of folding a portion of said netting across at least one side of said mat before the step of applying said stitching to said netting and mat.

12. The method of claim 10 further comprising the step of compressing said netting and said mat before applying said stitching to said netting against said mat and in said gap.

13. The method of claim 10 further comprising the step of pulling said mat and said mesh netting with a double draw roller after the step of applying said one or more rows of stitching.

14. A method for manufacturing evaporative cooler pads, comprising the steps of:

placing a plurality of mats of absorbent material on a first conveyor belt assembly, forming a gap between said mats by using a second conveyor belt assembly moving at a higher speed than said first conveyor belt assembly;

placing a lower netting layer under said plurality of mats and an upper netting layer over said plurality of mats to enclose said mats and said gap between said lower netting layer and said upper netting layer;

applying one or more rows of stitching to said lower netting layer and said upper netting layer against said mats and in said gap to bind said lower netting layer and said upper netting layer to said mats and to interconnect said lower netting layer and said upper netting layer in said gap;

pulling said mat, said lower netting and said upper netting layer with a double draw roller; and cutting said lower netting layer and said upper netting layer in said gap.

15. The method of claim 14 further comprising the step of folding a portion of said lower netting layer across at least one side of said plurality of mats before the step of applying said stitching to said lower netting layer and said upper netting layer against said mats.

16. The method of claim 14 further comprising the step of applying an adhesive to said stitching in said gap before the step of cutting said lower netting layer and said upper netting layer.

* * * * *